US008186691B2

(12) United States Patent
Baxi et al.

(10) Patent No.: US 8,186,691 B2
(45) Date of Patent: May 29, 2012

(54) COMPOSITE SEAL AND COUPLING

(75) Inventors: Nikhil R. Baxi, Cordova, TN (US); John K. Nichols, Oxford, MS (US); William P. Yetter, Chula Vista, CA (US); Daniel D. Labrenz, Chula Vista, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 981 days.

(21) Appl. No.: 11/676,716

(22) Filed: Feb. 20, 2007

(65) Prior Publication Data

US 2007/0222159 A1 Sep. 27, 2007

Related U.S. Application Data

(60) Provisional application No. 60/774,934, filed on Feb. 17, 2006.

(51) Int. Cl.
*F16L 17/073* (2006.01)

(52) U.S. Cl. ......... 277/609; 277/611; 277/612; 277/638

(58) Field of Classification Search ................. 277/609, 277/611, 612, 627, 638, 639, 649, 651; 285/910
See application file for complete search history.

(56) References Cited

U.S. PATENT DOCUMENTS

| | | | | |
|---|---|---|---|---|
| 695,174 A * | 3/1902 | Roller | ........................ | 277/612 |
| 2,192,739 A * | 3/1940 | Goetze | ........................ | 277/609 |
| 2,795,444 A * | 6/1957 | Nenzell | | |
| 3,195,906 A * | 7/1965 | Moyers | ........................ | 277/611 |
| 3,259,404 A * | 7/1966 | Papenguth | ................... | 277/639 |
| 3,448,986 A * | 6/1969 | Jelinek et al. | | |
| 3,578,346 A * | 5/1971 | Jelinek | ........................ | 277/611 |
| 3,603,602 A * | 9/1971 | Padula | ........................ | 277/554 |
| 3,871,668 A * | 3/1975 | Coker et al. | ................. | 277/643 |
| 3,918,725 A | 11/1975 | Dryer | | |
| 4,026,565 A * | 5/1977 | Jelinek | ........................ | 277/639 |
| 4,191,389 A * | 3/1980 | Jelinek | ........................ | 411/542 |
| 4,294,477 A * | 10/1981 | Ahlstone | ..................... | 285/336 |
| 4,300,773 A * | 11/1981 | Jelinek | | |
| 4,702,657 A * | 10/1987 | Jelinek | | |
| 4,802,698 A | 2/1989 | Fujisawa et al. | | |
| 5,011,162 A | 4/1991 | Jelinek | | |
| 5,071,174 A | 12/1991 | Griffin et al. | | |
| 5,092,634 A | 3/1992 | Miller | | |
| 5,145,190 A * | 9/1992 | Boardman | .................... | 277/596 |
| 5,492,343 A * | 2/1996 | Smith et al. | .................. | 277/638 |
| 5,538,262 A | 7/1996 | Matsumura | | |
| 5,540,463 A | 7/1996 | Potokar | | |

(Continued)

FOREIGN PATENT DOCUMENTS

DE    20 2004 008 043.5    5/2004

*Primary Examiner* — James Hewitt
(74) *Attorney, Agent, or Firm* — Renner, Otto, Boisselle & Sklar, LLP (57) ABSTRACT

A seal and coupling, wherein the seal has a thin profile including a primary sealing element that provides both a face and radial seal, and a secondary or backup sealing element that provides a face seal. The secondary or backup sealing element seals against leakage past or through the primary sealing element, and the retainer may be made of a fluid impervious material for blocking permeation of fluid from the primary to the secondary seal. The retainer may also function to prevent over-compression of the sealing elements, while also maintaining a radial spacing between the sealing elements.

28 Claims, 6 Drawing Sheets

U.S. PATENT DOCUMENTS

| | | |
|---|---|---|
| 5,558,344 A | 9/1996 | Kestly et al. |
| 5,938,246 A * | 8/1999 | Wallace et al. ............... 285/351 |
| 6,155,607 A | 12/2000 | Hewitt et al. |
| 6,260,854 B1 | 7/2001 | Lemon |
| 6,481,756 B1 | 11/2002 | Field et al. |
| 6,669,205 B2 * | 12/2003 | Schenk ......................... 277/612 |
| 6,868,684 B2 | 3/2005 | Law et al. |
| 7,063,327 B2 | 6/2006 | Salameh |
| 2004/0135323 A1 * | 7/2004 | Salameh ....................... 277/628 |
| 2006/0220326 A1 * | 10/2006 | Leadley-Brown et al. ... 277/609 |

\* cited by examiner

COMPOSITE SEAL AND COUPLING

RELATED APPLICATIONS

This application claims the benefit of U.S. Provisional Application No. 60/774,934 filed Feb. 17, 2006, which is hereby incorporated herein by reference.

FIELD OF THE INVENTION

The present invention relates to couplings and seals, and more particularly to a coupling and seal for use with refrigerant lines in air conditioning systems, particularly vehicle air conditioning systems.

BACKGROUND OF THE INVENTION

In many types of fluid systems, and particularly in many refrigeration and air conditioning systems, the tubes (also referred to as pipes, conduits or hoses) in the system are connected together by suitable couplings of various types. In vehicle air conditioning systems, a common practice had been to provide the tube ends with a fitting that involved turning a threaded fastener disposed coaxially on the tube to connect the tube to another component. Drawbacks associated with such type of fitting included difficulty in turning the fastener, such as a nut, in a crowded engine compartment, the risk of damage to a seal or seals used with the fitting due to over tightening or leakage due to under tightening, and twisting of the tube during tightening.

Various coupling configurations have been devised to eliminate one or more of these drawbacks. Notwithstanding, there remains a continuing need to provide improved tube couplings that, among other things, reduce the escape of the fluid from the system at the coupling. This is especially important in air conditioning systems, where it is desired to minimize the amount of refrigerant that escapes to the atmosphere through the coupling.

SUMMARY OF THE INVENTION

The present invention provides a seal and coupling, wherein the seal has a thin profile including a primary sealing element that provides both a face and radial seal, and a secondary or backup sealing element that provides a face seal. The secondary or backup sealing element seals against leakage past or through the primary sealing element, and the retainer may be made of a fluid impervious material for blocking permeation of fluid from the primary to the secondary seal. The retainer may also function to prevent over-compression of the sealing elements, while also maintaining a radial spacing between the sealing elements.

More particularly, a seal according to one aspect of the invention comprises a retainer having opposite axial side faces defining a maximum thickness of the retainer, and radially inner and outer annular sealing elements made of elastomeric material integrally joined to the retainer. The radially inner sealing element has annular face sealing lobes protruding axially beyond the opposite axial side faces of the retainer and a radial sealing lobe protruding radially inwardly from the face sealing lobes. The radially outer sealing element has annular face sealing lobes protruding axially beyond the opposite side faces of the retainer at a location respectively radially outwardly spaced from the face sealing lobes of the inner sealing element. When the seal is telescoped onto a tubular protruding portion of a male coupler, and the male coupler and a female coupler are joined to one another, the annular face sealing lobes of the seal will effect face seals between juxtaposed faces of the male and female couplers at radially spaced apart locations, and the radial sealing lobe will effect a radial seal with the protruding tubular portion.

In a preferred embodiment, the retainer is made of a material, such as metal or a composite material, that is impervious to fluid, thereby to provide a barrier to diffusion of fluid that may diffuse through the elastomeric material of the radially inner sealing element.

A preferred retainer has radially inner and outer peripheral portions, and an intermediate portion between the radially inner and outer peripheral portions. The intermediate portion may form the axial side faces that define the maximum thickness of the retainer, which maximum thickness is greater than the thicknesses of the radially inner and outer peripheral portions.

The radially inner peripheral portion may have a plurality of apertures such as tapered slots, and the radially inner sealing element may have portions filling the apertures, thereby to provide a mechanical axial and radial interlock between the radially inner sealing element and the retainer. The radially outer peripheral portion may have a plurality of apertures such as holes, and the radially outer sealing element has portions filling the apertures, thereby to provide a mechanical axial and radial interlock between the radially outer sealing element and the retainer.

The radially inner and outer peripheral portions of the retainer preferably have axial side faces axially inwardly offset, respectively, from the axial side faces of the intermediate portion.

In a preferred embodiment, the radially inner and outer sealing elements are molded to the retainer, and the intermediate portion may include radially extending passages through which the radially inner and outer sealing elements are interconnected by elastomeric material extending through the radially extending passages. Such passages, during molding of the sealing elements to the retainer, provide for flow of the elastomeric material from one radial side of the intermediate portion to the other. To minimize fluid permeation from the radially inner sealing element to the radially outer sealing element through the elastomeric material in the radially extending passages, the collective circumferential cross-sectional profile of the radially extending passages can be less than 10%, more preferably less than 5% and still more preferably less than 3%, of the cross-sectional area of the intermediate portion along a circumferential plane midway between the radially inner and outer edges of the axial side faces of the retainer. The radially extending passages may be formed by grooves in the axial side faces of the retainer, and the grooves may intersect respective slots in the radially inner peripheral portion of the retainer to facilitate material flow during molding of the sealing elements to the retainer.

According to another aspect of the invention, a coupling comprises the aforesaid seal and the male and female couplers. The seal may be telescoped onto the tubular protruding portion and the male and female couplers may be joined to one another by any suitable means, with the annular face sealing lobes of the seal effecting face seals between juxtaposed faces of the male and female couplers at radially spaced apart locations, and the radial sealing lobe effecting a radial seal with the protruding tubular portion.

The female coupler may include a bore for receiving the protruding tubular portion, and a counterbore for receiving the seal.

According to a further aspect of the invention, a seal comprises first and second rubber portions, the first rubber portion forming an inner diameter of the seal and the second rubber portion forming an outer diameter of the seal; and a metal retainer portion interposed between the first and second rubber portions. The metal retainer is formed by multiple arcuate sections with adjacent sections separated by an extension of rubber that connects the inner and outer rubber portions.

Further features of the invention will become apparent from the following detailed description when considered in conjunction with the drawings.

DETAILED DESCRIPTION

Figure 1:
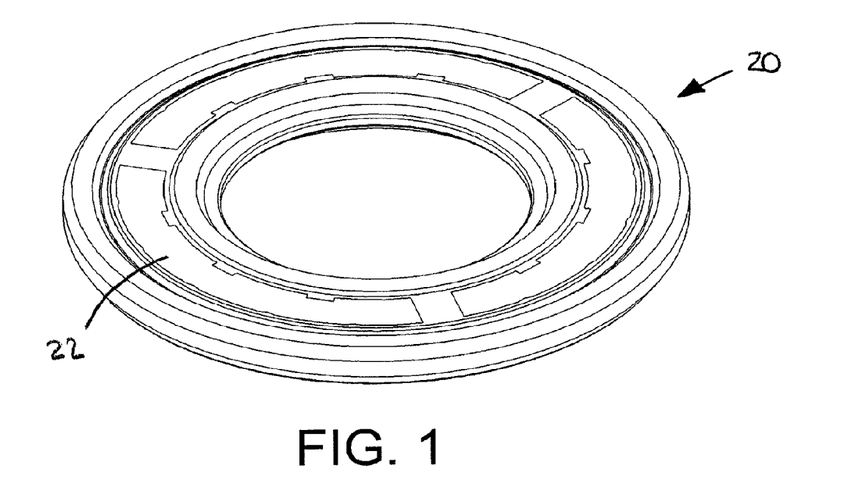
FIG. 1 is a perspective view of an exemplary seal according to the invention.
Figure 2:
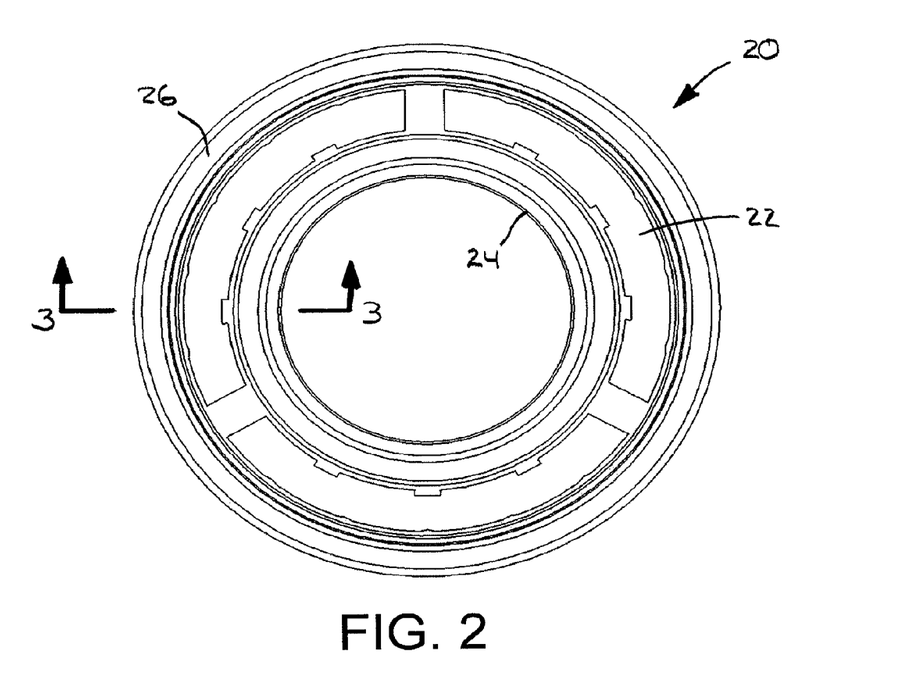
FIG. 2 is a plan view of the seal of FIG. 1 showing one axial side, the opposite axial side being a mirror image thereof.

Referring now to the drawings in detail and initially to FIGS. 1 and 2, an exemplary seal according to the invention is generally indicated at 20. The seal is intended for sealing between male and female couplers wherein the male coupler has a protruding tubular portion that is inserted into the female coupler during coupling. Such couplings are typically employed in air conditioning systems and more particularly in vehicle air conditioning systems. Accordingly, the present invention will be chiefly described in this context, it being understood, however, the principles of the invention may be more generally applicable to fluid tube couplings and seals.

The seal 20 generally comprises a retainer 22 and radially inner and outer annular sealing elements 24 and 26 made of elastomeric material integrally joined to the retainer.

Figure 3:
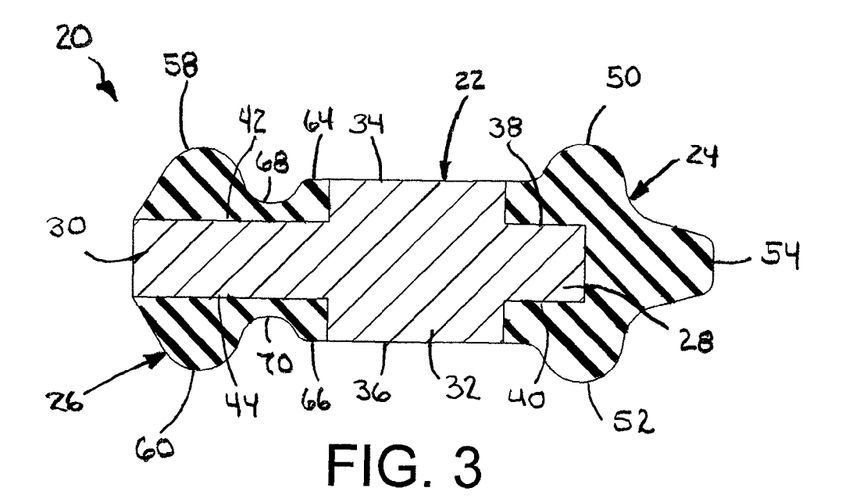
FIG. 3 is a cross-sectional view of the seal, taken along the line 3-3 of FIG. 2.

As best seen in FIG. 3, the retainer has radially inner and outer peripheral portions 28 and 30, and an intermediate portion 32 between the radially inner and outer peripheral portions. The intermediate portion 32 of the retainer has axial side faces 34 and 36 that define the maximum thickness of the retainer. The maximum thickness is greater than the thicknesses of the radially inner and outer peripheral portions. More particularly, axial side faces 38 and 40 of the radially inner peripheral portion are axially inwardly offset from respective side faces 34 and 36 of the intermediate portion to provide a reduced thickness annular flange or blade portion to which the radially inner sealing element 24 is integrally joined preferably by injection molding. Similarly, the axial side faces 42 and 44 of the radially outer peripheral portion are axially inwardly offset from respective side faces 34 and 36 of the intermediate portion to provide a reduced thickness annular flange or blade portion to which the radially outer sealing element 26 is integrally joined preferably by injection molding.

The radially inner sealing element 24 has annular face sealing lobes 50 and 52 protruding axially beyond the opposite axial side faces 34 and 36 of the retainer and a radial sealing lobe 54 protruding radially inwardly from the face sealing lobes. The face sealing lobes 50 and 52 may have arcuately rounded axially outer sealing surfaces whereas the radial sealing lobe 54 may be shaped more like a flap or lip. The face sealing lobes may have more than about half the radial thickness thereof extending radially inwardly beyond the radially inner peripheral portion and the other half extending radially coextensively with the radially inner peripheral portion of the retainer.

The radially outer sealing element 26 has annular face sealing lobes 58 and 60 protruding axially beyond the opposite side faces 34 and 36 of the retainer. The face sealing lobes 58 and 60 may have arcuately rounded axially outer sealing surfaces similar to the face sealing lobes 50 and 52. The face sealing lobes 58 and 60 are radially outwardly spaced from the face sealing lobes 50 and 52 of the radially inner sealing element 24, respectively.

The face sealing lobes 58 and 60 of the radially outer sealing element 26 may be coextensive over substantially the full radial extent thereof with the radially outer peripheral portion 30.

As shown, the face sealing lobes 58 and 60 of the radially outer sealing element 26 each may be radially outwardly spaced from a radially inner annular portion 64, 66 of the outer sealing element by a reduced thickness portion 68, 70 that has a thickness less than the maximum thickness of the retainer.

Figure 4:
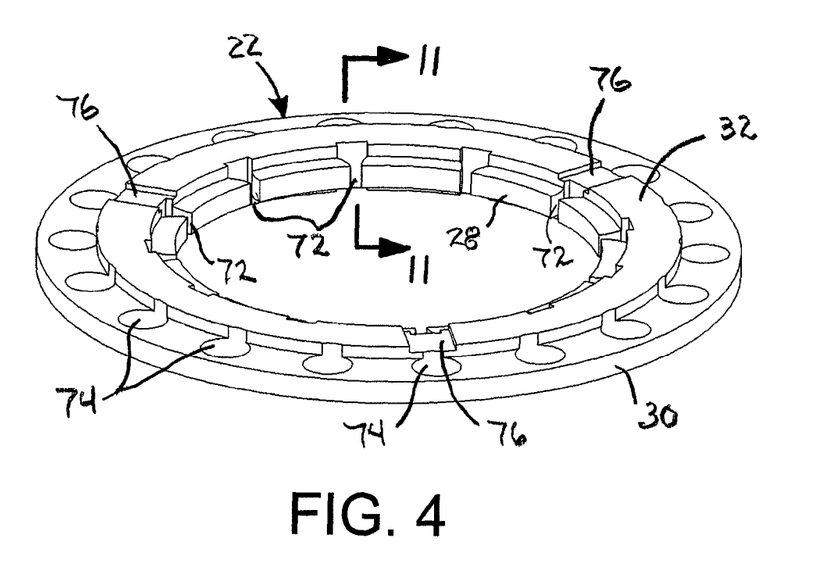
FIG. 4 is a perspective view of a retainer used in the seal of FIG. 1.
Figure 5:
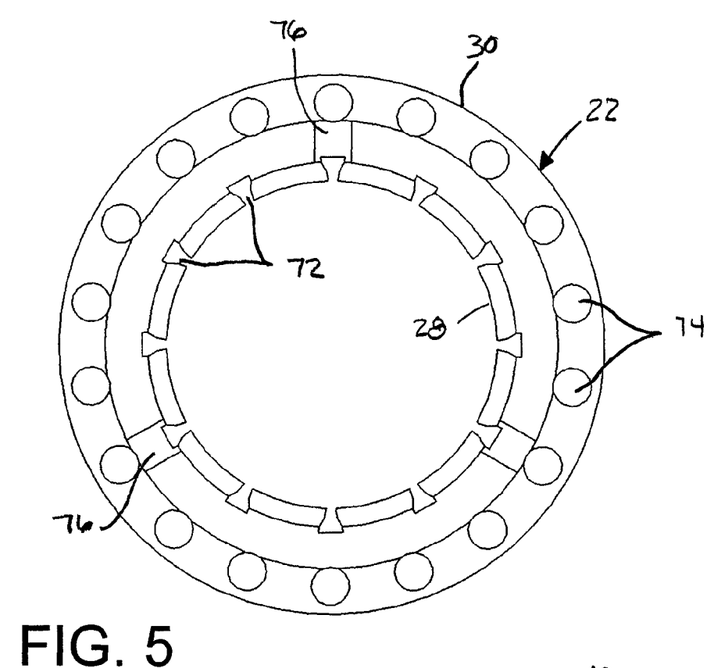
FIG. 5 is plan view of the retainer of FIG. 4, showing one axial side, the opposite side being a mirror image thereof.

With additional reference to FIGS. 4 and 5, the radially inner peripheral portion 28 of the retainer 22 has a plurality of apertures 72 which are filled with portions of the radially inner sealing element when the radially inner sealing element 24 is molded to the retainer. The apertures 72 may be a plurality of circumferentially equally spaced apart slots that open radially inwardly to the inner diameter of the retainer and increase in width going radially outwardly, this providing a radial as well as an axial mechanical interlock between the radially inner sealing element and the retainer. If desired, the slots 72 may extend radially partway in the intermediate portion 32.

Likewise, the radially outer peripheral portion 30 has a plurality of apertures 74, and the radially outer sealing element 26 has portions filling the apertures, thereby to provide an axial and radial mechanical interlock between the radially outer sealing element and the retainer. The apertures may be a plurality of circumferentially equally spaced apart axial holes as shown.

Figure 11:
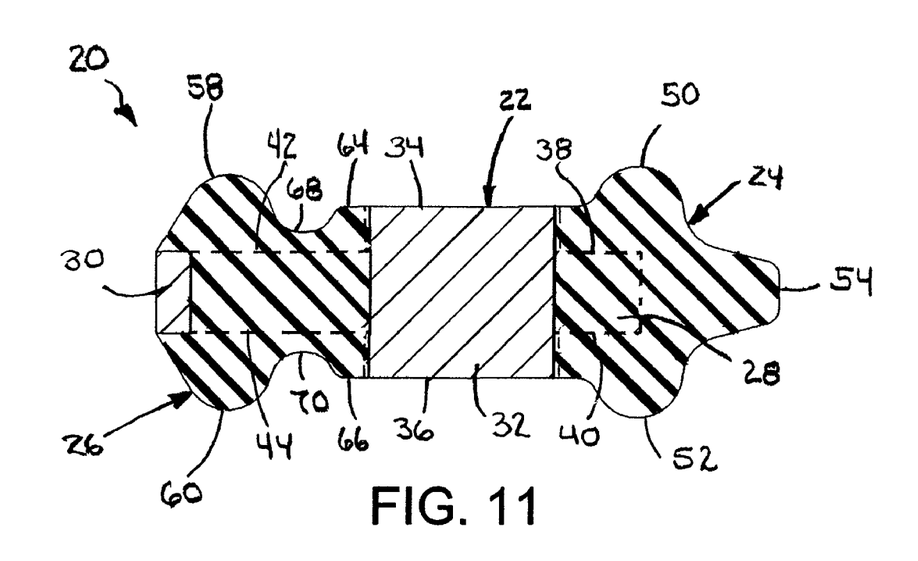
FIG. 11 is a cross-sectional view of the seal of FIG. 3, taken along the line 11-11 of FIG. 4.

As above mentioned, the radially inner and outer sealing elements 24 and 26 preferably are molded to the retainer 22. The retainer is placed in the mold cavity formed by mating mold halves, which then are closed to form the cavity into which uncured elastomeric material is injected. The mold may provide for flow of the uncured elastomer into the portion of the mold cavity in which one of the sealing elements is formed, such as the radially inner sealing element. To allow for flow of the uncured elastomer into the cavity portion in which the other sealing element is formed, the intermediate portion of the retainer includes radially extending passages 76. Thus, the radially inner and outer sealing elements will be interconnected by elastomeric material extending through the radially extending passages 76 as seen in FIG. 11, such passages during molding providing for flow of the elastomeric material from one radial side of the intermediate portion to the other. In the illustrated embodiment, the passages are formed by grooves in the axial side surfaces 34 and 36 of the intermediate portion, there being three such passages that are circumferentially spaced apart on each side of the retainer. Each radial passage may intersect a respective slot 72 and hole 74 in the retainer to facilitate flow into and out of the radial passage.

The retainer 22 preferably is made of a material impervious to fluid, thereby to provide a barrier to diffusion of fluid that may diffuse through the elastomeric material of the sealing elements 24 and 26 that are made of an elastomeric material, such as hydrogenated nitrile butadiene rubber (HNBR) or ethylene propylene (EP) rubber. The retainer, for example, may be made of metal such as steel, or of a composite material. The sealing elements alternatively could be made of different elastomeric materials if desired, in which case the radial passages 76 could be eliminated.

With the foregoing in mind, it is desirable for the flow through passages 76 in the intermediate portion 32 of the retainer 22 to have a minimum cross-sectional profile to minimize diffusion of fluid through the elastomeric material in such passages. The collective circumferential cross-sectional profile of the radially extending passages preferably is less than 10%, more preferably less than 5% and still more preferably less than 3%, of the cross-sectional area of the intermediate portion along a circumferential plane midway between the radially inner and outer edges of the axial side faces of the retainer. The term "cross-sectional profile" is intended to mean the minimum of cross-section of the respective radial passage, regardless of where the minimum cross-section area may be located. In the illustrated embodiment, the grooves are of uniform cross-section so the "cross-sectional profile" would be the cross-sectional area at any radial point along the radial extent of the groove.

Figure 6:
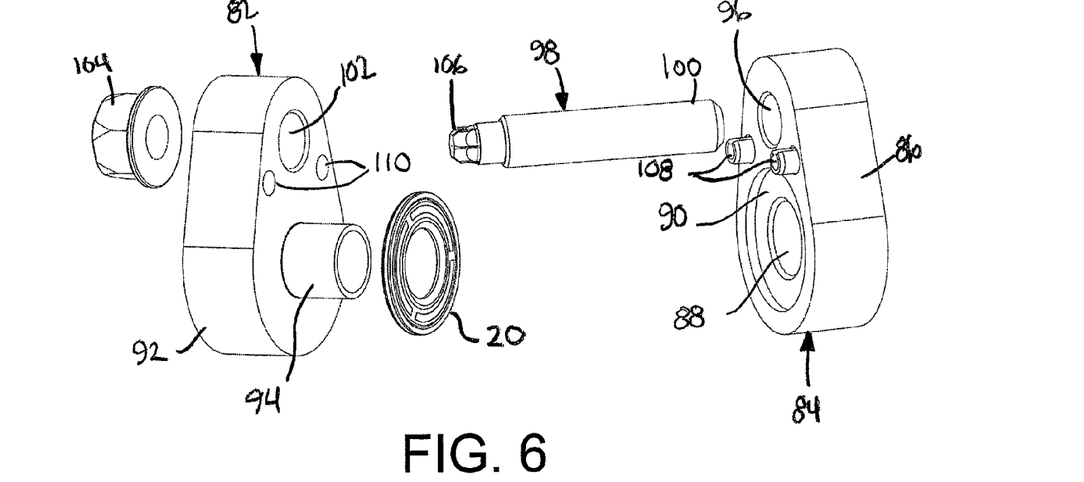
FIG. 6 is an exploded perspective view of an exemplary coupling according to the present invention, employing the seal of FIG. 1.
Figure 7:
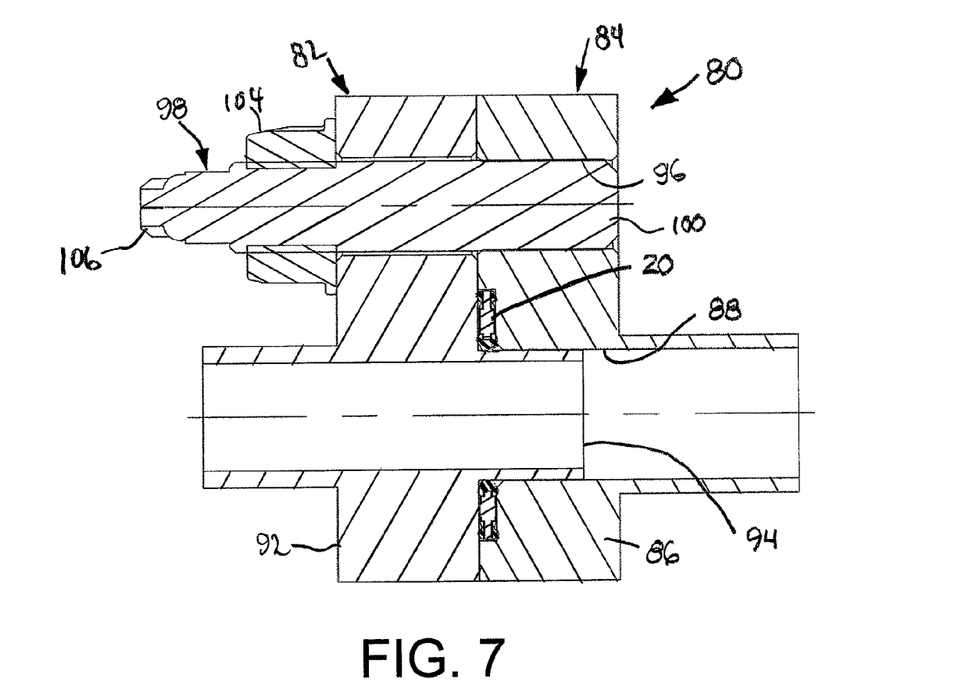
FIG. 7 is a cross-sectional view of the coupling of FIG. 6.

Referring now to FIGS. 6 and 7, an exemplary use of the seal 20 is illustrated. The seal 20 forms part of a coupling 80 including male and female couplers 82 and 84. The coupling 80 shown in FIGS. 6 and 7 is a common type of dual plane seal coupling used in automotive A/C systems. The female coupler 84 includes a female coupler body 86 (also referred to as a block) that has a bore 88 and a counterbore 90 for receiving the seal 20. The male coupler 82 includes a male coupler body 92 and a tubular portion 94 protruding from one face of the male coupler body (also referred to as a block). The tubular protruding portion 94, also referred to as a pilot, may be formed as one piece with the male coupler body 92, by a separate piece secured to the male coupler body as by brazing or other suitable means, or by the end of a tube that is being connected by the male coupler to the female coupler 84. The tube may be secured to the coupler body by conventional means such as by brazing.

The female coupler body 86 (or block) also has a threaded aperture 96 for threaded receipt of a fastener such has a bolt 98. The bolt 98 has a threaded portion 100 that is threaded into the threaded hole in the female coupler body. The bolt passes through a hole 102 in the male coupler body 92 and a nut 104 is threaded onto the end of the bolt and tightened to secure the coupler bodies together. The end of the bolt is provided with a reduced size wrenching head 106 for engagement by a wrench whereby the bolt can be screwed into the female coupler body. Guide pins 108 and mating holes 110 may also be provided to align the coupler bodies when being brought together.

The seal 20 is telescoped over the pilot 94. The radial seal and pilot 94 are relatively sized such that the radial seal will be caused axially to deflect to one side thereby to tightly grip the outer diameter surface of the tubular projection. The face seal lobes of the radially inner and outer sealing elements will engage respective axial faces of the coupling bodies thereby effecting face seals therewith. Over-compression of the seals is prevented by the retainer 22, the thickness of which defines the spacing between the axial faces of the coupler bodies.

As will be appreciated, the radially inner sealing element will function as a primary seal that may be exposed to full system refrigerant pressure in an air conditioner system, whereas the radially outer sealing element will function as a secondary or backup seal. The primary sealing element provides both a face and radial seal, and the secondary or backup sealing element provides a face seal. The secondary or backup sealing element seals against any leakage past or through the primary sealing element, while the retainer substantially blocks permeation of fluid from the primary to the secondary seal, while also functioning to prevent over-compression of the sealing elements and maintaining a radial spacing between the sealing elements.

As will be appreciated, the illustrated seal can reduce manufacturing and maintenance costs, can facilitate assembly in the coupling, and greatly minimizes fluid leakage to the atmosphere.

Figure 8:
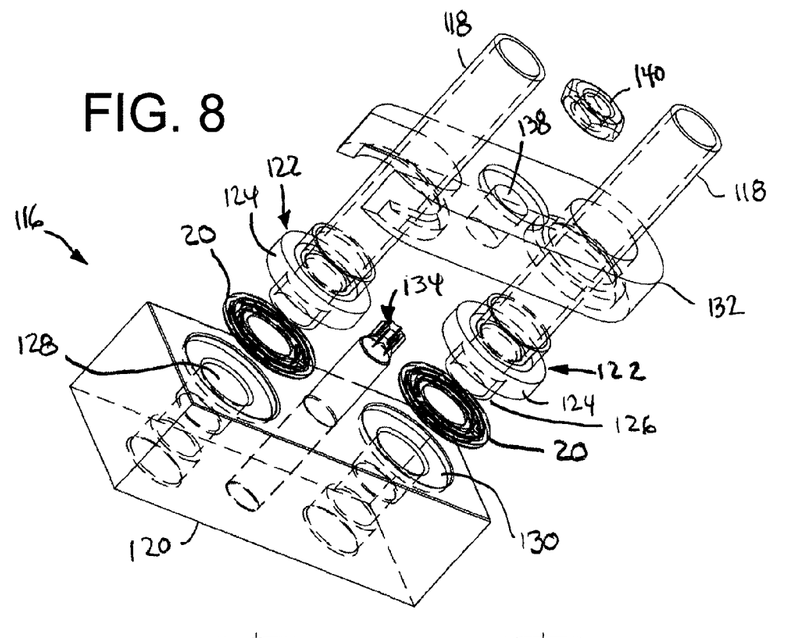
FIG. 8 is an exploded perspective view of another coupling according to the present invention, employing the seal of FIG. 1.
Figure 9:
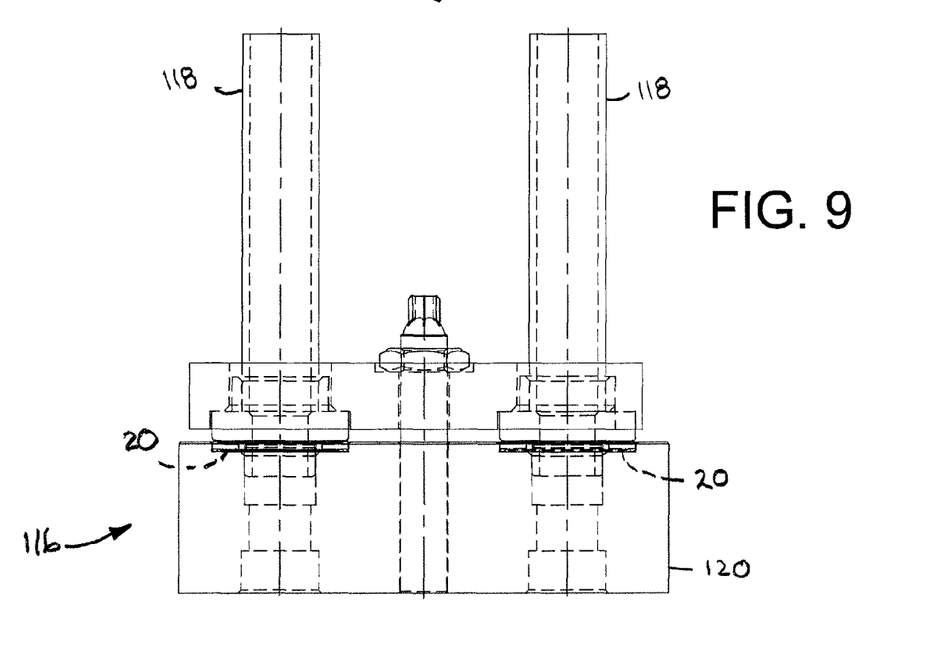
FIG. 9 is an elevational view of the coupling of FIG. 8.

Referring now to FIGS. 8 and 9, another coupling 116 is illustrated. This coupling 116 provides for the coupling of two tubes 118 to a female coupler block 120. Each tube has secured thereto, as by brazing, a fitting 122 having a collar 124 from which a portion of the tube projects to form a pilot 126 for insertion into a bore 128 in the female coupler block. Each bore has a counterbore 130 for receiving a respective seal 20. The fittings 122 are secured to the female coupler block by a retainer 132 and fastener bolt 134 that has one end threaded into a threaded bore in the female coupler block. The retainer has a hole 138 through which the fastener extends, and a nut 140 is threaded onto the protruding end of the bolt to secure the retainer to the female coupler block with the tube fitting collars and seals sandwiched between the retainer and female coupler block. The seals will seal between the axial face of the collar and the bottom of the counterbore in the same manner as described above in relation to the coupler shown in FIGS. 6 and 7.

Figure 10:
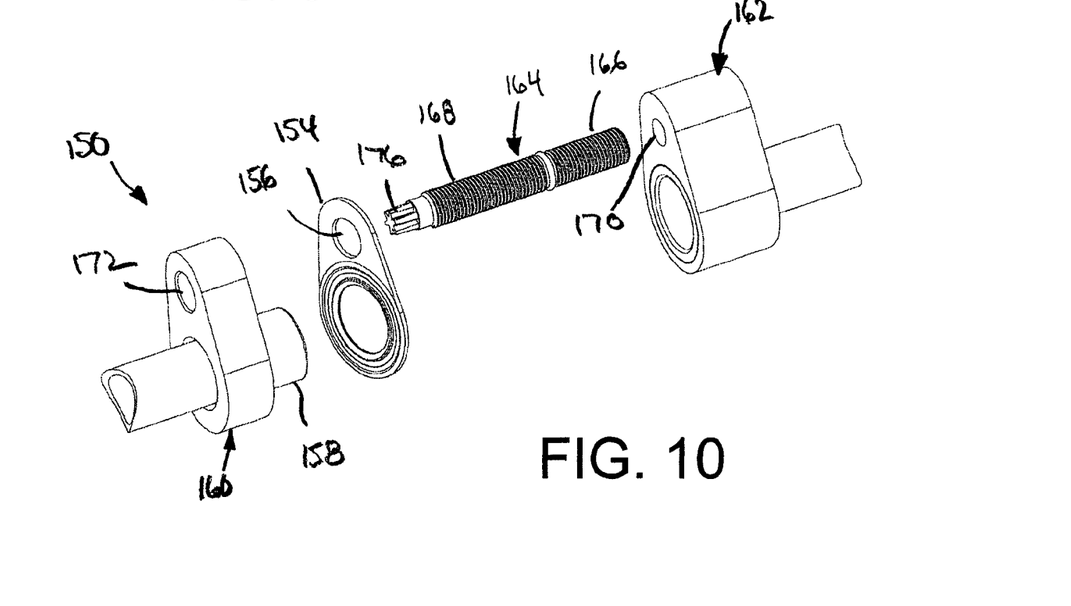
FIG. 10 an exploded perspective view of another coupling according to the present invention, employing a modified seal.

FIG. 10 shows still another coupling 150 using a modified seal 152. The seal 152 is the same as the seal 20, except the retainer has a locating ear portion 154 protruding radially outwardly beyond the radially outer sealing element. The locating ear has an aperture 156 extending therethrough. As seen in FIG. 10, the seal is telescoped over a pilot 158 of a male coupler 160 and the male coupler and a female coupler 162 are assembled together by a bolt 164 that passes through the hole 156 in the locating ear. In the coupling of FIG. 10, the bolt has oppositely threaded portions 166 and 168 for threaded receipt in respective threaded bores 170 and 172 respectively in the female and male coupler bodies. The bolt also has a wrenching head 176. Rotation of the bolt will cause the male and female coupler bodies to be drawn together whereupon they will be sealed with respect to one another by the seal in the same manner as described above with respect to the coupling of FIGS. 5 and 6.

Although the sealing elements have been described as being molded to the retainer, other means may be employed, such as adhesive bonding.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A seal for sealing between male and female couplers wherein the male coupler has a protruding tubular portion that is inserted into the female coupler during coupling, the seal comprising a retainer having opposite axial side faces defining a maximum thickness of the retainer, and radially inner and outer annular sealing elements made of elastomeric material integrally joined to the retainer, the radially inner sealing element having annular face sealing protrusions protruding axially beyond the opposite axial side faces of the retainer, and the radially outer sealing element having annular face sealing protrusions protruding axially beyond the opposite side faces of the retainer at a location respectively radially outwardly spaced from the face sealing protrusions of the inner sealing element, whereby when the seal is telescoped onto the protruding tubular portion and the male and female couplers are joined to one another, the annular face sealing protrusions of the seal will effect face seals between juxtaposed faces of the male and female couplers at radially spaced apart locations; and wherein the retainer has radially inner and outer peripheral portions, and an intermediate portion between the radially inner and outer peripheral portions, the intermediate portion having the axial side faces that define the maximum thickness of the retainer, which maximum thickness is greater than the thicknesses of the radially inner and outer peripheral portions.

2. A seal as set forth in claim 1, wherein the retainer is made of a material impervious to fluid, thereby to provide a barrier to diffusion of fluid that may diffuse through the elastomeric material of the radially inner sealing element.

3. A seal as set forth in claim 2, wherein the retainer is made of metal.

4. A seal as set forth in claim 2, wherein the retainer is made of a composite material.

5. A seal as set forth in claim 1, wherein the radially inner peripheral portion has a plurality of apertures, and the radially inner sealing element has portions filling the apertures, thereby to provide a mechanical axial and radial interlock between the radially inner sealing element and the retainer.

6. A seal as set forth in claim 5, wherein the apertures in the radially inner peripheral portion are radially inwardly opening slots that increase in width going radially outwardly, and the radially inner sealing element has radially outer portions filling the slots, thereby to provide a mechanical axial and radial interlock between the radially inner sealing element and the retainer.

7. A seal as set forth in claim 6, wherein the slots extend radially partway in the intermediate portion.

8. A seal as set forth in claim 1, wherein the radially inner peripheral portion has axial side faces axially inwardly offset, respectively, from the axial side faces of the intermediate portion.

9. A seal as set forth in claim 8, wherein the face sealing protrusions of the radially inner sealing element have more than about half the radial thickness thereof extending radially inwardly beyond the radially inner peripheral portion.

10. A seal as set forth in claim 1, wherein the radially outer peripheral portion has axial side faces axially inwardly offset, respectively, from the axial side faces of the intermediate portion.

11. A seal as set forth in claim 10, wherein the face sealing protrusions of the radially outer sealing element are coextensive over substantially the full radial extent thereof with the radially outer peripheral portion.

12. A seal as set forth in claim 10, wherein the face sealing protrusions of the radially outer sealing element are radially outwardly spaced from a radially inner annular portion of the outer sealing element by a reduced thickness portion that has a thickness less than the maximum thickness of the retainer.

13. A seal as set forth in claim 1, wherein the radially outer peripheral portion has a plurality of apertures, and the radially outer sealing element has portions filling the apertures, thereby to provide a mechanical axial and radial interlock between the radially outer sealing element and the retainer.

14. A seal as set forth in claim 13, wherein the apertures in the radially outer peripheral portion are axial holes, and the radially outer sealing element has portions filling the holes, thereby to provide a mechanical axial and radial interlock between the radially outer sealing element and the retainer.

15. A seal as set forth in claim 1, wherein the radially inner and outer sealing elements are molded to the retainer, and the intermediate portion includes radially extending passages through which the radially inner and outer sealing elements are interconnected by elastomeric material extending through the radially extending passages, such passages during molding providing for flow of the elastomeric material from one radial side of the intermediate portion to the other.

16. A seal as set forth in claim 15, wherein the collective circumferential cross-sectional profile of the radially extending passages is less than 10% of the cross-sectional area of the intermediate portion along a circumferential plane midway between the radially inner and outer edges of the axial side faces of the retainer.

17. A seal as set forth in claim 15, wherein the collective circumferential cross-sectional profile of the radially extending passages is less than 5% of the cross-sectional area of the intermediate portion along a circumferential plane midway between the radially inner and outer edges of the axial side faces of the retainer.

18. A seal as set forth in claim 15, wherein the radially extending passages are formed by grooves in the axial side faces of the retainer.

19. A seal as set forth in claim 15, wherein the radially inner peripheral portion has a plurality of radially inwardly opening slots, the radially inner sealing element has portions filling the slots, and the radially extending passages intersect respective ones of the slots, thereby to facilitate the flow of the elastomeric material through the intermediate portion during molding thereof to the retainer.

20. A seal as set forth in claim 1, wherein the retainer has a locating ear portion protruding radially outwardly from the radially outer sealing element, which locating ear portion has an aperture extending therethrough.

21. A seal as set forth in claim 1, wherein the annular face sealing protrusions are rounded lobes.

22. A seal as set forth in claim 1, wherein the radially inner sealing element has a radial sealing protrusion protruding radially inwardly from the face sealing protrusions for effecting a radial seal with the protruding tubular portion.

23. A seal as set forth in claim 22, wherein the radial sealing protrusion is shaped like a flap or lip.

24. A seal as set forth in claim 1, wherein the radially inner and outer sealing elements are molded to the retainer, and the radially inner and outer sealing elements are interconnected by elastomeric material extending across the intermediate portion of the retainer.

25. A seal for sealing between male and female couplers wherein the male coupler has a protruding tubular portion that is inserted into the female coupler during coupling, the seal comprising a retainer having opposite axial side faces defining a maximum thickness of the retainer, and radially inner and outer annular sealing elements made of elastomeric material integrally joined to the retainer, the radially inner sealing element having annular face sealing protrusions protruding axially beyond the opposite axial side faces of the retainer, and the radially outer sealing element having annular face sealing protrusions protruding axially beyond the opposite side faces of the retainer at a location respectively radially outwardly spaced from the face sealing protrusions of the inner sealing element, whereby when the seal is telescoped onto the tubular protruding portion and the male and female couplers are joined to one another, the annular face sealing protrusions of the seal will effect face seals between juxtaposed faces of the male and female couplers at radially spaced apart locations; and wherein the retainer has a plurality of apertures, and the radially outer sealing element has portions filling the apertures, thereby to provide a mechanical axial and radial interlock between the radially outer sealing element and the retainer.

26. A seal as set forth in claim 25, wherein the apertures are axial holes, and the radially outer sealing element has portions filling the holes, thereby to provide a mechanical axial and radial interlock between the radially outer sealing element and the retainer.

27. A coupling comprising a seal as set forth in claim 1, and the male and female couplers, and wherein when the seal is telescoped onto the protruding tubular portion and the male and female couplers are joined to one another, and the annular face sealing protrusions of the seal effect face seals between juxtaposed faces of the male and female couplers at radially spaced apart locations.

28. A coupling as set forth in claim 27, wherein the female coupler includes a bore for receiving the protruding tubular portion, and a counterbore for receiving the seal.

* * * * *